United States Patent [19]

Chmiel

[11] Patent Number: 4,786,850
[45] Date of Patent: Nov. 22, 1988

[54] MOTOR STARTING CIRCUIT WITH TIME DELAY CUT-OUT AND RESTART

[75] Inventor: Steven F. Chmiel, Milwaukee, Wis.

[73] Assignee: PT Components, Inc., Milwaukee, Wis.

[21] Appl. No.: 85,645

[22] Filed: Aug. 13, 1987

[51] Int. Cl.[4] .............................................. H02P 1/44
[52] U.S. Cl. .................................... 318/786; 318/785
[58] Field of Search ................. 318/785, 786, 778, 779

[56] References Cited

U.S. PATENT DOCUMENTS 4,605,888 8/1986 Kim ..................................... 318/786

Primary Examiner—David Smith, Jr.
Attorney, Agent, or Firm—Andrus, Sceales, Starke & Sawall

[57] ABSTRACT

A motor starting circuit (10) is provided for disconnecting the start winding (14) of a single phase AC induction motor from an AC source (18) after a time delay. A start switch (22) in series with the start winding (14) controls energization and disconnection of the start winding (14). Turn-on of the start switch (22) is controlled by a turn-on switch 28 connected in parallel across the start switch (22) and not across the start winding (14). Turn-off of the start switch (22) is controlled by a cut-out switch (50) which in turn is controlled by an RC timing circuit (58, 60) connected across the AC source (14). A restart switch (64) may be added without changing the remaining circuitry. The restart switch (64) controls charging of the timing capacitor (60) and causes reconnection of the start winding (14) to the AC source (18) when motor speed drops below a given cut-in speed.

6 Claims, 2 Drawing Sheets

"NIBBLE"

"NO NIBBLE"

MOTOR STARTING CIRCUIT WITH TIME DELAY CUT-OUT AND RESTART

BACKGROUND AND SUMMARY

The invention relates to disconnect or cut-out switching systems for the start or auxiliary winding of a single phase AC induction motor.

A single phase AC induction motor typically includes a squirrel cage rotor and two stator windings, namely a main winding and a start or auxiliary winding. The main winding is connected across an AC power source and normally has low resistance and high inductance. The start or auxiliary winding is physically displaced from the main winding and has high resistance and low inductance. In a split phase type AC motor, the physical displacement of the motor stator windings together with the electrical phase displacement produced by the different resistance and inductance values generates a rotating magnetic field sufficient to provide a low level starting torque. Other types of single phase AC induction motors for higher torque applications include capacitor start type motors and capacitor start run type motors. In these types of motors, a capacitor is connected in series with the start winding to provide higher starting torque. In each of the motor types, after the motor has accelerated to 75-80% of its synchronous speed, a switch opens and the start winding is disconnected from the AC power source.

Various types of disconnection systems are known, including time delay type. A timer is started at initial energization of the motor. When the timer times out after a predetermined set timing interval, a switch is turned OFF to disconnect the start winding from the AC power source.

The present invention provides an improved and simplified motor starting circuit with time delay, type cut-out of the start winding. A start switch in series with the start winding controls energization and de-energization of the start winding. A turn-on switch controls turn-on of the start switch. A timing circuit controls turn-off of the start switch. The turn-on switch is connected in parallel across the start switch and not across the start winding, such that the start switch and the turn-on switch each see the same phase. This is significant because the turn-on switch and the start switch will thus turn on at the same time, without phase delay therebetween, which in turn maximizes energization of the start winding. In contrast, if the turn-on switch is connected across the AC line it will turn on at a different time than the start switch because of the phase difference therebetween due to the inductance of the start winding in series with the start switch, and the capacitance of the start capacitor if present. The turn-on switch supplies gate current to the start switch which is in phase with the AC line voltage but is not in phase with the voltage across the start switch due to the noted inductance and capacitance. This results in chopping or nibbling of the AC waveform applied to the start winding, which in turn reduces starting torque.

The present invention eliminates nibbling of the AC waveform applied to the start winding. In the present invention, the turn-on switch supplies gate to the start switch which is in phase with the voltage across the start switch to provide in phase turn-on of the latter such that a smooth continuous AC waveform is applied to the start winding to maximize energization thereof, without nibbling. This maximizes starting torque.

The invention also enables the addition of a simple minimum part content restart circuit without changing or redesigning the existing starting and cutout circuitry. The restart circuit provides for reconnection of the start winding to the AC source when motor speed drops below a given cut-in speed.

DETAILED DESCRIPTION

Figure 1:
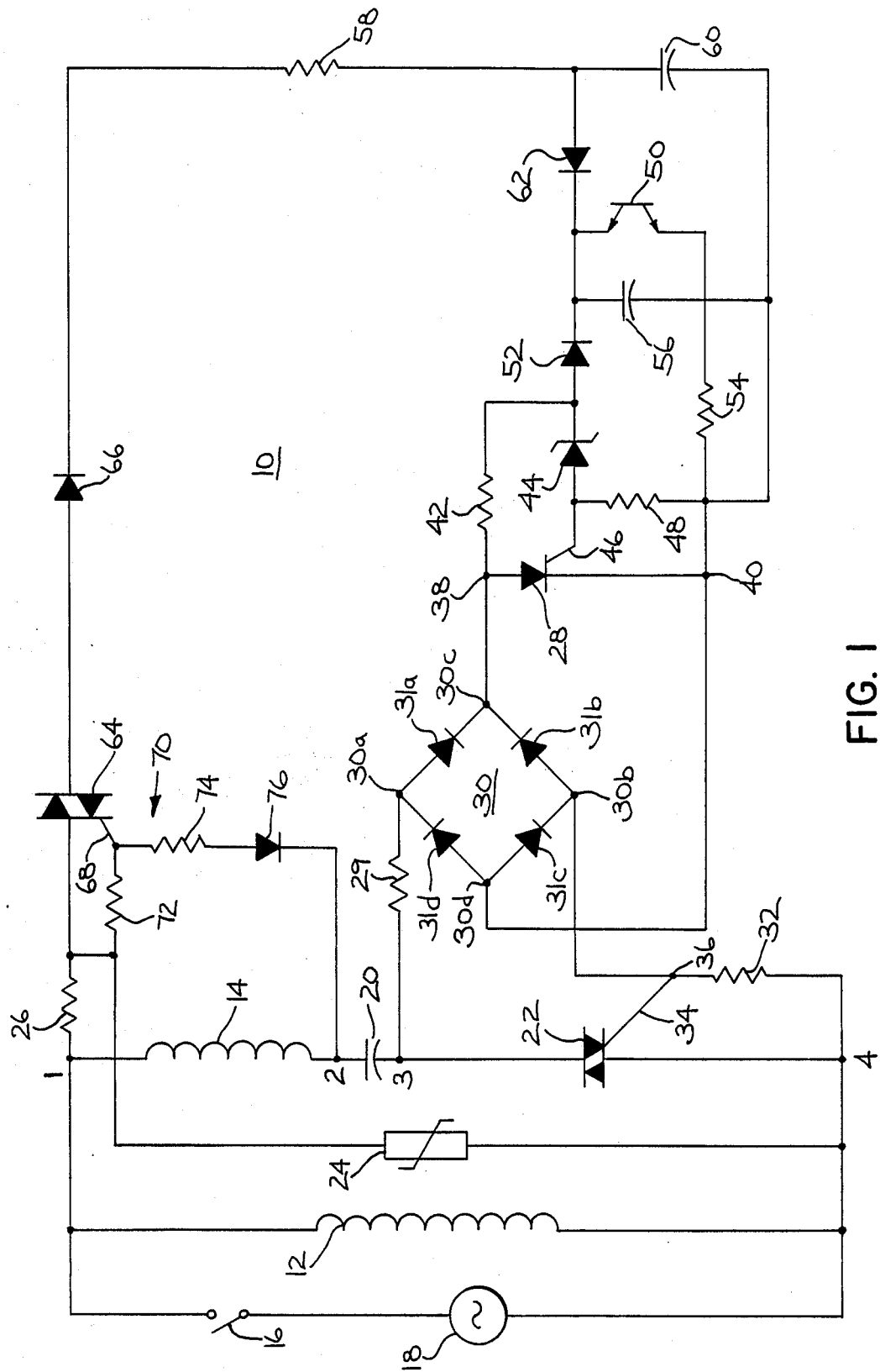
FIG. 1 is a circuit diagram illustrating a motor starting circuit in accordance with the invention.

FIG. 1 shows a motor starting circuit 10 for use with a single phase AC induction motor having a main winding 12 and a start or auxiliary winding 14 both connectable by a switch 16 to an AC power source 18 at terminals 1 and 4. In capacitor start and capacitor start run type motors, the start winding circuit includes a start capacitor 20 connected between terminals 2 and 3, in series with start winding 14. In split phase type motors, capacitor 20 is omitted. A start switch is provided by triac 22 connected in series with the start winding circuit. The series connected start switch 22 and start winding 14 are connected in parallel across AC source 18. Triac 22 has a conductive ON state conducting current therethrough to complete a current path through start winding 14 from AC source 18. Triac 22 has a nonconductive OFF state blocking current flow through start winding 14 from AC source 18. Varistor 24 is connected in parallel across triac 22 and start winding 14 through resistor 26 to provide protection against voltage transients and spikes.

A turn-on switch is provided by an SCR 28 connected through full wave rectifying diode bridge 30 across triac 22. Bridge 30 has four rectifying diodes 31a, 31b, 31c and 31d. Bridge 30 has one of its AC input terminals 30a connected through resistor 29 to triac main terminal 3, and has its other AC input terminal 30b connected through resistor 32 to the other main terminal 4 of the triac. Resistor 32 is connected between triac gate terminal 34 and main terminal 4. Bridge terminal 30b is connected at node 36 to the junction of gate 34 and resistor 32. Bridge 30 is connected in parallel across triac 22, and not across start winding 14. Bridge 30 has one of its DC output terminals 30c connected to the anode 38 of SCR 28, and has its other DC output terminal 30d connected to the cathode 40 of SCR 28. SCR 28 is connected through bridge 30 in parallel across triac 22, and not across start winding 14. SCR 28 has a conductive ON state conducting current therethrough to complete a current path from AC source 18 through start winding 14 through bridge 30 through SCR 28 to gate 34 of triac 22 to turn the latter ON. SCR 28 has a nonconductive OFF state blocking current flow to triac gate 34 such that triac 22 is OFF. When SCR 28 is OFF, triac 22 is OFF. SCR 28 IS TURNED ON by gate current from AC source 18 through start winding 14 through bridge 30 through resistor 42 and Zener diode 44 to SCR gate 46 to develop gate drive bias across resistor 48. Zener diode 44 has about a three volt reverse breakover threshold which is quickly overcome by a 120 volt AC source 18. Since SCR 28 is connected in parallel across triac 22 and not across start winding 14, SCR 28 sees the same voltage phase as triac 22, and hence provides substantially in-phase turn-on of triac 22, i.e. the gate current supplied by SCR 28 to triac 22 is in phase with the voltage across triac 22.

A cut-out switch is provided by a diac 50 coupled to resistor 42 and gate 46 and connected in O parallel with resistor 48. Diac 50 has a conductive ON state conducting current therethrough to divert gate current through resistor 42 away from gate 46 such that SCR 28 turns OFF at the next half cycle. The current from resistor 42 is diverted through diode 52 through diac 50 and resistor 54 to bridge 30. This current is limited by resistors 42 and 54 to a level below the turn-on value for triac 22. Capacitor 56 provides filtering and voltage smoothing. Diac 50 has a nonconductive OFF state blocking current flow therethrough such that gate current through resistor 42 flows to gate terminal 46 to turn ON SCR 28.

A timing circuit is provided by resistor 58 in series with timing capacitor 60. Resistor 58 and capacitor 60 are connected in parallel across AC source 18 and main winding 12 and in parallel across the series connected start winding 14 and triac 22. When timing capacitor 60 is charged to a given threshold voltage after a given timing interval, such charge through diode 62 biases diac 50 into conduction, such that SCR 28 turns OFF such that triac 22 turns OFF such that start winding 14 is disconnected from AC source 18.

A restart switch is provided by a triac 64 connected through diode 66 to the timing circuit 58, 60. Triac 64 has a conductive ON state conducting current therethrough to complete a current path from AC source 18 through triac 64 through diode 66 through resistor 58 to charge timing capacitor 60. Triac 64 has a nonconductive OFF state blocking current flow to prevent charging of timing capacitor 60. Triac 64 has a gate 68 connected in a gate circuit 70 including resistors 72, 74 and diode 76 across start winding 14.

At initial energization of the motor upon closure of switch 16, current flows from AC source 18 through start winding 14 through bridge 30 and resistor 42 to gate 46 to turn on SCR 28 which in turn conducts current to gate 34 to turn on triac 22 which in turn conducts starting current therethrough to connect start winding 14 to AC source 18. Starting torque is thus developed by the motor. When triac 22 turns ON, current flows through start winding 14 and gate circuit 70 such that gate drive bias is developed to turn ON triac 64. Timing capacitor 60 thus begins charging. When the charge on timing capacitor 60 reaches the breakover threshold voltage of diac 50, the latter turns ON, which in turn diverts gate current from resistor 42 away from gate 46, such that SCR 28 turns OFF, which in turn blocks gate current to gate 34 such that triac 22 turns OFF, to disconnect start winding 14 from AC source 18. The motor should now be rotating at some speed.

Motor rotation induces a voltage in start winding 14 even when the latter is disconnected from AC source 18. If motor speed is above a given cut-in speed, the induced voltage in start winding 14, as sensed by gate circuit 70 thereacross, is sufficient to keep triac 64 ON. Current from AC source 18 thus continues to flow through triac 64 and keeps timing capacitor 60 charged, whereby diac 50 remains ON and SCR 28 remains OFF and triac 22 remains OFF. If motor speed drops below cut-in speed, the induced voltage across start winding 14 also drops and is insufficient to provide enough gate drive bias for gate circuit 70, such that triac 64 turns OFF. Timing capacitor 60 then discharges through diac 50, after which diac 50 turns OFF because of insufficient bias from timing capacitor 60. When diac 50 turns OFF, SCR 28 turns ON such that triac 22 turns ON, to reconnect start winding 14 to AC source 18 to re-apply starting torque and restart the motor. Upon turn-on of triac 22, the current flow through start winding 14 and gate circuit 70 again provides sufficient gate drive bias to turn on triac 64 to again begin charging capacitor 60.

Figure 2:
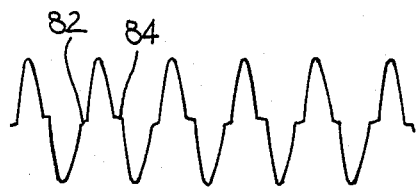
FIG. 2 is a timing diagram illustrating a nibbling effect which is overcome by the present invention.

FIG. 2 shows start winding current if bridge input 30a and resistor 29 were connected to terminal 1, and illustrates the current nibbling resulting therefrom. SCR 28 would then not see the same phase as triac 22. SCR 28 would see the phase of the AC line. Triac 22 sees a different phase because of the inductance of start winding 14 and the capacitance of start capacitor 20. SCR 28 would thus deliver current to gate 34 which is not in phase with the voltage across triac 22 between terminals 3 and 4. Because of this phase difference, less than the entire AC waveform is applied to start winding 14, as shown by flat spots such as 82 and 84 where there is momentarily nonconduction.

Figure 3:
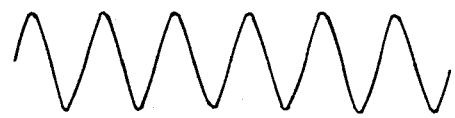
FIG. 3 is a timing diagram like FIG. 2 but illustrating operation of the circuitry of FIG. 1 overcoming the noted nibbling problem.

In contrast, FIG. 3 shows the start winding current for the circuitry of FIG. 1 wherein input bridge terminal 30a and resistor 29 are connected to terminal 3 such that turn-on SCR is connected across triac 22 and not across start winding 14 nor start capacitor 20. In this circuit arrangement, SCR 28 thus sees the same phase as triac 22. SCR 28 delivers gate current to gate 34 of triac 22 which is in phase with the voltage across triac 22 between terminals 3 and 4, to thus provide in-phase turn-on of triac 22. This maximizes energization of start winding 14 and provides smooth continuous current flow therethrough as shown in FIG. 3, without the flat spots of FIG. 2. The nibbling of FIG. 2 is thus eliminated in FIG. 3.

Figure 4:
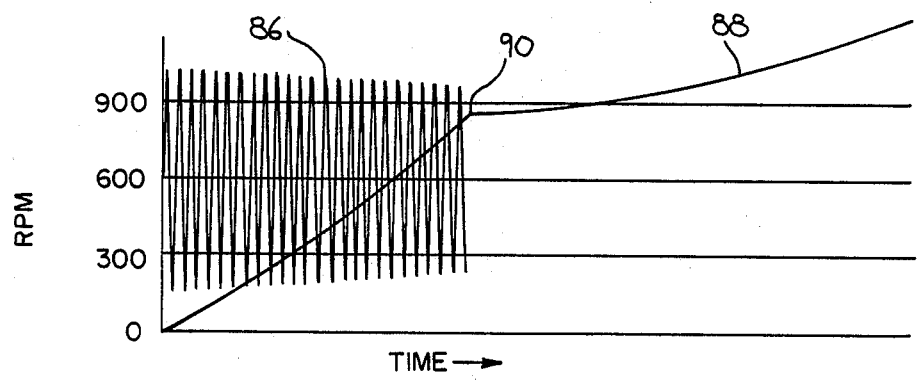
FIG. 4 is a timing diagram illustrating the lower starting torque caused by the nibbling of FIG. 2.
Figure 5:
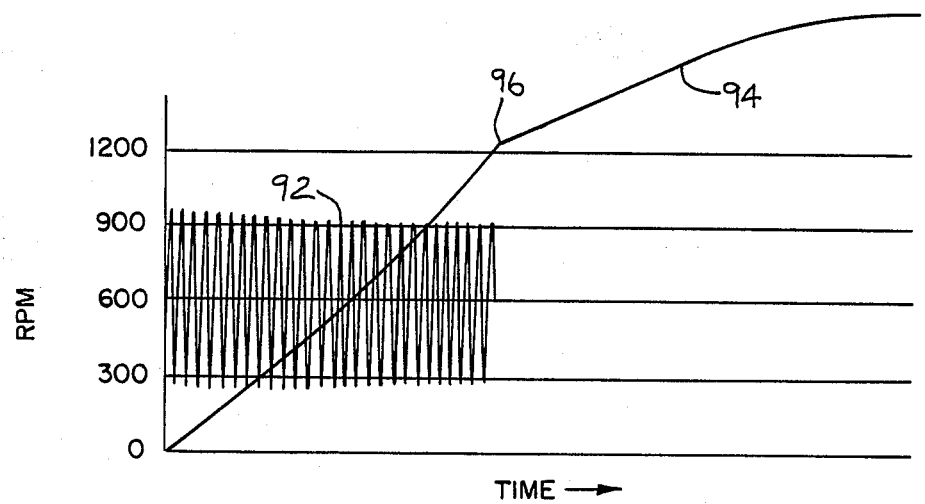
FIG. 5 is a timing diagram illustrating the higher starting torque afforded by the circuitry of the present invention.

FIG. 4 shows in waveform 86 the start winding current on a more compressed scale than FIG. 2. Line 88 shows motor speed. At cutout at point 90, i.e. upon turn-off of triac 22, motor speed was about 850 rpm. FIG. 5 shows start winding current at waveform 92 on a more compressed scale than FIG. 3, and shows motor speed at line 94. At cutout at point 96, motor speed is about 1100 rpm. Cutout at point 90 in FIG. 4 and cutout at point 96 in FIG. 5 each occurred about 400 milliseconds after initial energization of the start winding. It is seen that the "no nibbling" of FIG. 3 produces a higher motor speed at cutout, FIG. 5, than the "nibbling" effect of FIG. 2 which produces a lower motor speed at cutout, FIG. 4. The higher motor speed of FIG. 5 means that greater starting torque has been applied. The circuitry of FIG. 1 maximizes energization of the start winding and improves efficiency in starting the motor.

It is recognized that various equivalents, alternatives and modifications are possible within the scope of the appended claims.

I claim:

1. In a single phase AC induction motor having a main winding and a start winding both connectable to an AC power source, and having start switch means in series with said start winding for disconnecting said start winding from said AC source, an improved time delay disconnect control comprising:

turn-on switch means connected across said start switch means and not across said start winding, and turning on said start switch means to connect said start winding to said AC source at energization of said motor;

cut-out switch means turning off said start switch means to disconnect said start winding from said AC source after a given time delay following said energization;

timing means connected across said AC source and coupled to said cut-out switch means to provide said time delay following said energization, wherein said timing means comprises an RC timing circuit including a resistor and a timing capacitor, said RC timing circuit being connected across said AC source in parallel with said main winding and in parallel with the series connectd start winding and start switch means, and comprising restart switch means connected in series with said RC timing circuit and sensing start winding voltage and turning ON to permit charging of said timing capacitor when said start winding voltage is above a given value.

2. The invention according to claim 1 wherein:

start voltage during said time delay starting interval, with said start switch means ON and current flowing through said start winding, is above said given value such that said restart switch means is ON and permits charging of said timing capacitor;

said given value of sensed start winding voltage corresponds to a designated cut-in motor speed, such that after said time delay disconnect of said start winding, said motor speed is normally above said cut-in speed and sensed start winding voltage induced by motor rotation keeps said restart switch means ON such that said timing capacitor remains charged such that said cut-out switch means is ON such that said start switch means remains OFF, and such that when motor speed drops below said cut-in speed, sensed induced start wiinding voltage drops below said given value such that said restart switch means turns OFF and prevents continued charging of said timing capacitor such that the latter discharges and said cut-out switch means turns OFF such that said turn-on switch means turns said start switch means ON to reconnect said start winding to said AC source.

3. The invention according to claim 1 comprising a start capacitor connected in series between said start winding and said start switch means.

4. The invention according to claim 3 wherein:

said turn-on switch means is connected across said start switch means and not across said start winding and not across said start capacitor;

said restart switch means includes means connected across said start winding and not across said start capacitor and not across said start switch means.

5. A motor starting circuit for a single phase AC motor having a main winding and start winding energizeable by an AC source, comprising:

a start winding circuit including said start winding and having a first main terminal connected to said AC source and having a second main terminal;

start switch means connected in series with said start winding circuit, said start switch means having a first main terminal connected to said second main terminal of said start winding circuit and having a second main terminal connected to said AC source, such that the series connected start switch means and start winding circuit are connected across said AC source, said start switch means having a conductive ON state conducting current therethrough to complete a current path through said start winding circuit from said AC source, said start switch means having a nonconductive OFF state blocking current flow through said start winding circuit from said AC source, said start switch means having a gate terminal for controlling conduction of said start switch means, and comprising resistance means connected between said gate terminal and said second main terminal of said start switch means;

turn-on switch means connected across said start switch means and not across said start winding circuit, said turn-on switch means having a first main terminal connected to said first main terminal of said start switch means and having a second main terminal connected to the junction of said gate terminal of said start switch means and said resistance means, said turn-on switch means having a conductive ON state conducting current therethrough to complete a current path from said AC source through said start winding circuit through said turn-on switch means to said gate terminal of said start switch means to turn the latter ON, said turn-on switch means having a nonconductive OFF state blocking current flow to said gate terminal of said start switch means such that the latter is OFF, said turn-on switch means having a gate terminal for controlling conduction of said turn-on switch means, and comprising second resistance means connected between said first main terminal of said turn-on switch means and said gate terminal of said turn-on switch means to supply gate current from said AC source through said start winding circuit through said second resistance means to said gate terminal of said turn-on switch means to turn the latter ON, and comprising third resistance means connected between said gate terminal of said turn-on switch means and said second main terminal of said turn-on switch means;

cut-out switch means connected across said third resistance means, said cut-out switch means having a first main terminal connected to the junction of said gate terminal of said turn-on switch means and said second resistance means, said cut-out switch means having a second main terminal connected to the junction of said second main terminal of said turn-on switch means and said third resistance means, said cut-out switch means having a conductive ON state conducting current therethrough to divert gate current through said second resistance means away from said gate of said turn-on switch means such that the latter is OFF, said cut-out switch means having a nonconductive OFF state blocking current flow therethrough such that gate current through said second resistance means flows to said gate terminal of said turn-on switch means to turn the latter ON;

a timing circuit connected across said AC source and across the series connected start winding circuit and start switch means, said timing circuit including a timing capacitor controlling conduction of said cut-out switch means such that when said timing capacitor is charged to a given threshold voltage after a given timing interval the charge on said capacitor turns ON said cut-out switch means, wherein said cut-out switch means comprises a two terminal diac, the first terminal of said diac being connected to said junction of said gate terminal of said cut-out switch means and said second resistance means, the second terminal of said diac being connected to said junction of said second main terminal of said turn-on switch means and said third resistance means, and wherein said timing capacitor is connected in parallel across said diac, said timing capacitor having one plate connected to said first diac terminal and having a second plate connected to said second diac terminal.

6. A motor starting circuit for a single phase AC motor having a main winding and start winding energizeable by an AC source, comprising:

a start winding circuit including said start winding and having a first main terminal connected to said AC source and having a second main terminal;

start switch means connected in series with said start winding circuit, said start switch means having a first main terminal connected to said second main terminal of said start winding circuit and having a second main terminal connected to said AC source, such that the series connected start switch means and start winding circuit are connected across said AC source, said start switch means having a conductive ON state conducting current therethrough to complete a current path through said start winding circuit from said AC source, said start switch means having a nonconductive OFF state blocking current flow through said start winding circuit from said AC source, said start switch means having a gate terminal for controlling conduction of said start switch means, and comprising resistance means connected between said gate terminal and said second main terminal of said start switch means;

turn-on switch means connected across said start switch means and not across said start winding circuit, said turn-on switch means having a first main terminal connected to said first main terminal of said start switch means and having a second main terminal connected to the junction of said gate terminal of said start switch means and said resistance means, said turn-on switch means having a conductive ON state conducting current therethrough to complete a current path from said AC source through said start winding circuit through said turn-on switch means to said gate terminal of said start switch means to turn the latter ON, said turn-on switch means having a nonconductive OFF state blocking current flow to said gate terminal of said start switch means such that the latter is OFF, said turn-on switch means having a gate terminal for controlling conduction of said turn-on switch means, and comprising second resistance means connected between said first main terminal of said turn-on switch means and said gate terminal of said turn-on switch means to supply gate current from said AC source through said start winding circuit through said second resistance means to said gate terminal of said turn-on switch means to turn the latter ON, and comprising third resistance means connected between said gate terminal of said turn-on switch means and said second main terminal of said turn-on switch means;

cut-out switch means connected across said third resistance means, said cut-out switch means having a first main terminal connected to the junction of said gate terminal of said turn-on switch means and said second resistance means, said cut-out switch means having a second main terminal connected to the junction of said second main terminal of said turn-on switch means and said third resistance means, said cut-out switch means having a conductive ON state conducting current therethrough to divert gate current through said second resistance means away from said gate of said turn-on switch means such that the latter is OFF, said cut-out switch means having a nonconductive OFF state blocking current flow therethrough such that gate current through said second resistance means flows to said gate terminal of said turn-on switch means to turn the latter ON;

a timing circuit connected across said AC source and across the series connected start winding circuit and start switch means, said timing circuit including a timing capacitor controlling conduction of said cut-out switch means such that when said timing capacitor is charged to a given threshold voltage after a given timing interval the charge on said capacitor turns ON said cut-out switch means;

restart switch means connected in series with said timing circuit for controlling charging of said timing capacitor, said restart switch means having a first main terminal connected to the junction of said AC source and said first main terminal of said start winding circuit and having a second main terminal connected to said timing circuit, said restart switch means having a conductive ON state conducting current therethrough to complete a current path from said AC source through said restart switch means to charge said timing capacitor, said restart switch means having a nonconductive OFF state blocking current flow to prevent charging of said timing capacitor, said restart switch means having a gate circuit connected across said start winding, such that when said start switch means turns ON, current flows through said start winding and said gate circuit of said restart switch means and turns ON said restart switch means, and such that upon time delay turn OFF of said start switch means the induced voltage in said start winding due to motor rotation is normally sufficient to provide sufficient gate drive bias in said gate circuit of said restart switch means to turn the latter ON, and such that upon decrease in motor speed below a given value, the induced voltage in said start winding is insufficient to provide enough gate drive bias for said restart switch means such that the later turns OFF, and said timing capacitor discharges such that said cut-out switch means turns OFF such that said turn-on switch means turns ON such that said start switch means turns ON and conducts current through said start winding circuit from said AC source.

* * * * *